H. C. SMITH.
SHEARS FOR CUTTING METAL.
APPLICATION FILED AUG. 28, 1911.
1,063,298.
Patented June 3, 1913.
4 SHEETS—SHEET 1.
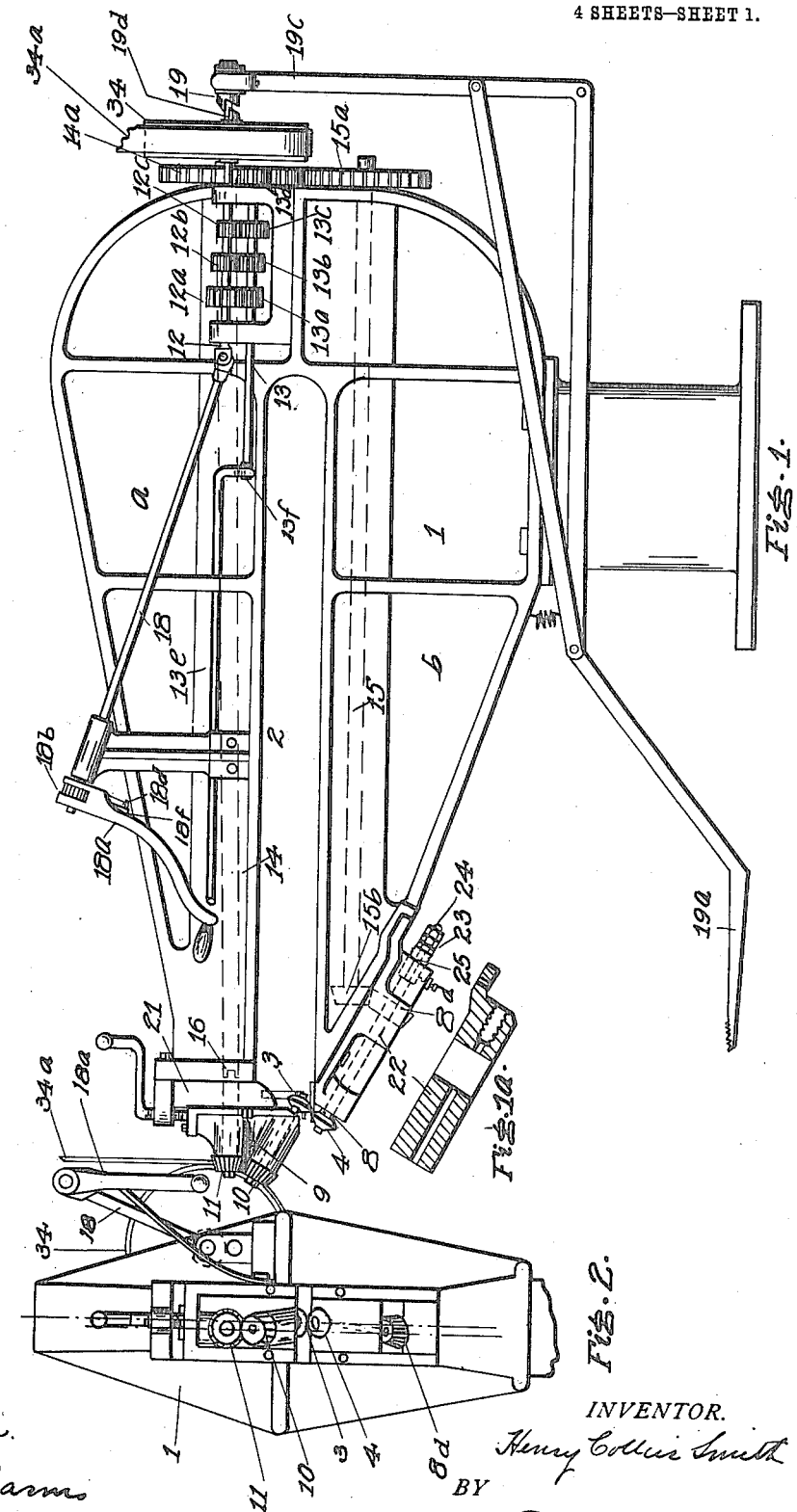
WITNESSES:
H. E. Sloman.
Stuart C. Barns
INVENTOR.
Henry Collins Smith
BY
Parker Burton
ATTORNEY.

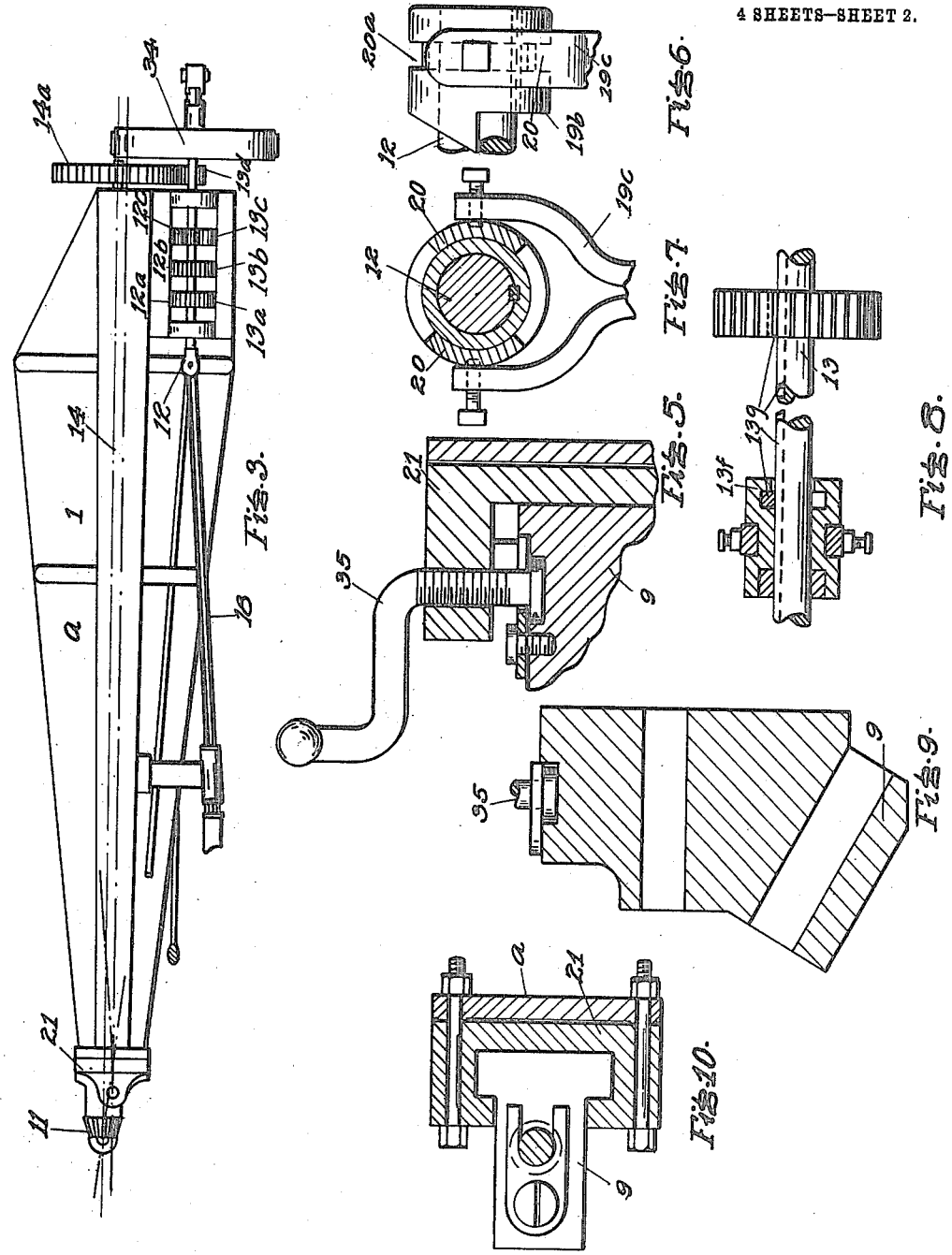

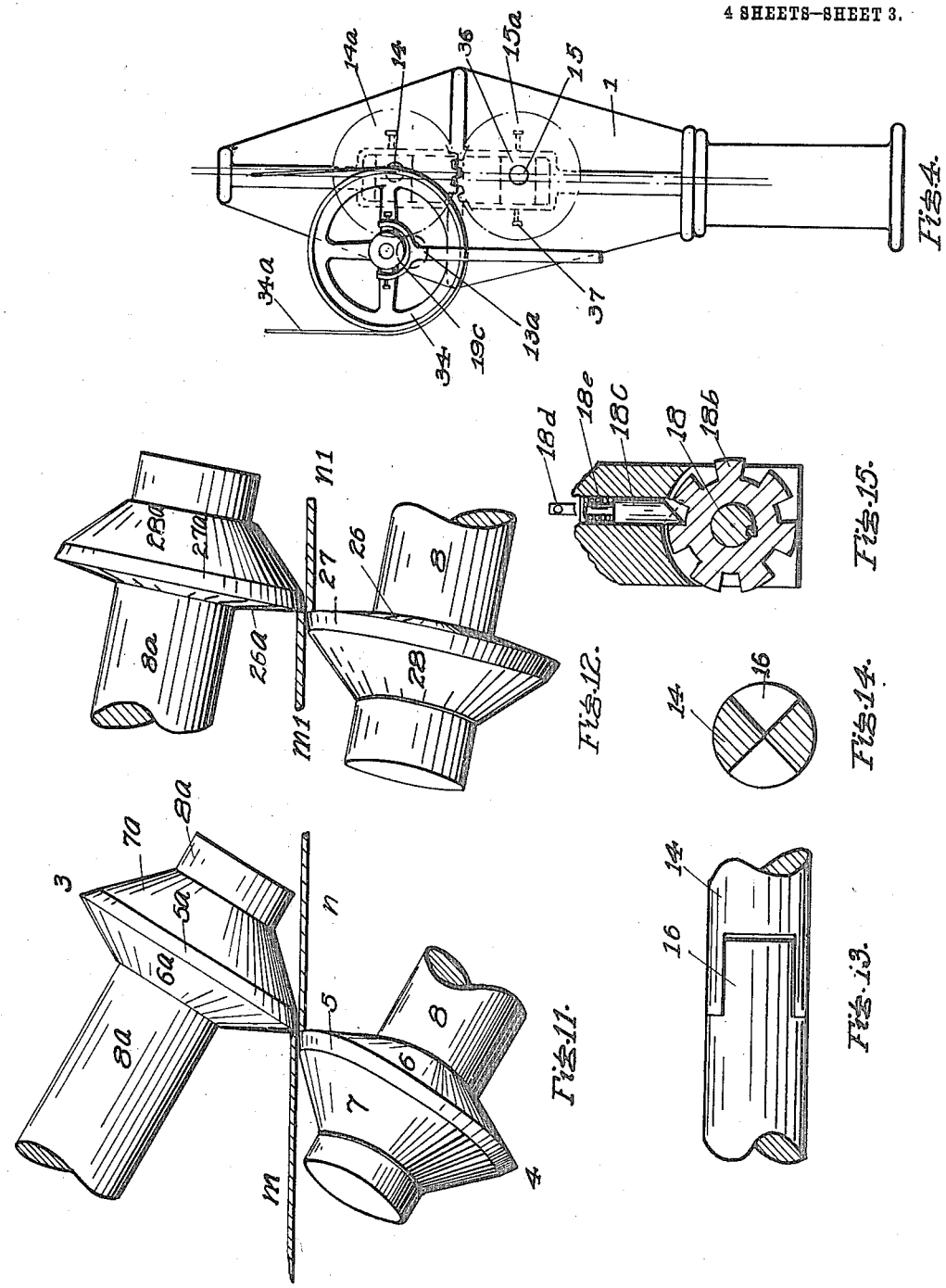

H. C. SMITH.
SHEARS FOR CUTTING METAL.
APPLICATION FILED AUG. 28, 1911.

1,063,298.

Patented June 3, 1913.

4 SHEETS—SHEET 4.

UNITED STATES PATENT OFFICE.

HENRY COLLIER SMITH, OF DETROIT, MICHIGAN.

SHEARS FOR CUTTING METAL.

1,063,298.  Specification of Letters Patent.  Patented June 3, 1913.

Application filed August 28, 1911. Serial No. 646,462.

*To all whom it may concern:*

Be it known that I, HENRY COLLIER SMITH, a citizen of the United States, residing at Detroit, county of Wayne, State of Michigan, have invented a certain new and useful Improvement in Shears for Cutting Metal, and declare the following to be a full, clear, and exact description of the same, such as will enable others skilled in the art to which it pertains to make and use the same, reference being had to the accompanying drawings, which form a part of this specification.

This invention relates to shears for cutting metal, or sheet material of any kind.

It has for its object an improved machine intended to cut sheets of moderate thickness and of any size along lines of any geometrical design; having a capacity to cut any line from an accurately straight line to a curved line with a radius equal to the cutters or even less than the radius of the cutters, and the cutters may have a very small radius.

Figure 16:
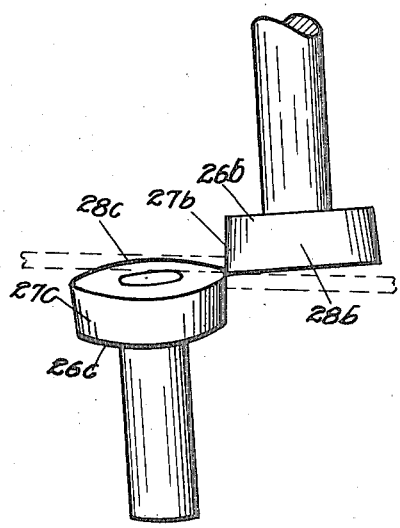
Figure 17:
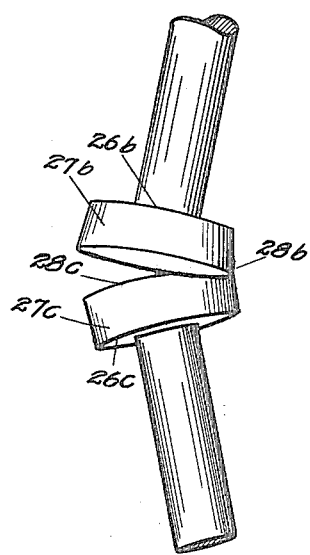
Figure 18:
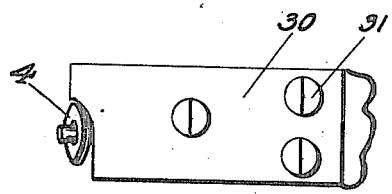
Figure 19:
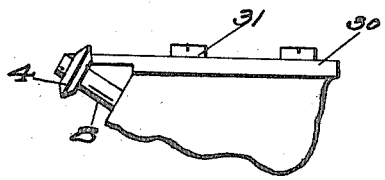
Figure 20:
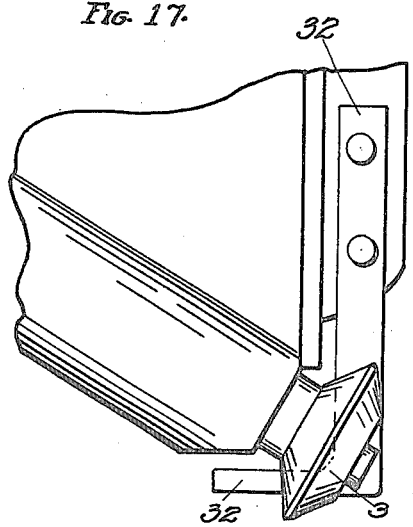

In the drawings:—Figure 1, is a side elevation of the assembled machine. Fig. 1ª, is a section of the lower cutter-shaft bearing. Fig. 2, is a front elevation. Fig. 3, is a plan view. Fig. 4, is a rear elevation. The remaining figures are details of structural parts, of these, Fig. 5, is a sectional detail of the cutter adjuster. Fig. 6, is a side elevation of the starting clutch. Fig. 7, is a cross section of the same. Fig. 8, is a longitudinal section of a change speed clutch. Fig. 9, is a section of the bearing for the driving mechanism of the upper shear. Fig. 10, is a cross section of the guide for the same bearing. Fig. 11, is a side elevation of a pair of cutters. Fig. 12, is a side elevation of a pair of cutters. Fig. 13, is a side elevation of a universal joint near the bearings shown in Fig. 9. Fig. 14, is a cross section of the same universal joint. Fig. 15, is a cross section showing the ratchet wheel connected with the hand lever. Fig. 16, is a side view of a pair of cutters as they would be shaped, if the shafts were nearly vertical. Fig. 17, is a view of the same cutters taken from a position 90 degrees removed. Fig. 18, is a top view of a plate or stripping-finger engaging about the lower cutter blade. Fig. 19, is a side view of the same. Fig. 20, is a side view of a stripping finger located near the upper cutter blade.

A properly supported frame 1 provided with a deep recess 2 carries at the mouth end of said recess the bearings for cutters 3 and 4. The cutters 3 and 4 are circular, similar in construction of equal or unequal diameters and are driven by mechanism, a part of which is on the upper arm *a* of the frame 1 and a part of which is on the lower arm *b* of the frame 1. The peculiar novelty of the machine is found in the arrangement and shape of the cutters of which there are two in each machine and a specific description of one will furnish an understanding of the peculiar features of the cutter.

The shearing edge of each cutter is the meeting circle of two conical zones 5 and 6 (Fig. 11); a section through the shearing edge and through the zone surfaces on a plane radial to the axis of the zones would show the angle very nearly 90°. In order that the cutting edge may be ground, it is desirable that the angle be slightly less than 90 degrees, from 87° to 88°; although efficient work may be produced with cutting heads in which the shearing faces are at a less degree than that specified, the best work is produced when the angle is substantially quite close to the angle specified. The surface 7 of the head behind the zone having the surface 5 is more obliquely coned toward the axis of the cutter and extends to the shaft part 8. In the assembled machine, the two cutter heads are placed with the shearing edges between the zones 5 and 6 and the zones $5^a$ and $6^a$ in shearing relation, as shown in Fig. 11 with the shafts 8 and $8^a$ at a slight inclination, the one to the other with reference to the planes which pass through the axes of the two shafts. In Fig. 11, the axes of the two shafts appear parallel in the elevation there shown. In the elevation at right angles to the one there shown, which is indicated in Fig. 2, the axes are shown in their true inclined position. This inclination of the shafts with respect to each other is such that imaginary planes passing through the cutting edges of the cutters would (if extended) intersect each other. This relative inclination of the shafts also brings the two adjacent surfaces of the two cutters into parallel and closely contiguous relation, so that the cutters may be moved relatively to each other until the cutting edges almost contact the shafts. The contact of the cutters with the metal is a point contact and the metal under treatment between the shearing edges separates as shown at the meeting of the sheets $m$ and $n$ which indicate the severed portions of a sheet. This allows of turning the metal to cut sharp curves and even a reverse curve without mutilating the metal. The zones 6 and $6^a$ would have practically a sliding contact so that the cutters enter the metal at a point in advance of a line drawn through the axis of said cutters. The upper cutter can be raised or lowered with respect to the lower cutter by turning the crank 35 which is journaled on the bearing-block 9 and threaded in the guide piece 21. These cutters are mounted on the ends of a frame with the upper cutter 3 on the end of a shaft $8^a$ mounted in bearing-block 9, (shown in Fig. 9) and driven by means of a bevel gear 10 on the shaft $8^a$, which meshes with a bevel gear 11 on a shaft 14. Near the power end of shaft 12 are arranged a number of change speed gears $12^a$, $12^b$ and $12^c$, all of which are fast to the shaft and all of which are constantly in mesh with spur gears $13^a$, $13^b$ and $13^c$ on a counter shaft 13. The counter shaft 13 is driven by the gears on shaft 12 and in turn drives, by means of the wheel $13^d$, the wheel $14^a$ of the shaft 14. The wheel $14^a$ meshes with the wheel $15^a$ on the lower shaft 15 which drives the shaft 8 of the lower cutter head.

The connection between shafts 15 and 8 is by means of bevel gears $15^b$ and $8^d$, one of which is on the shaft 15 and the other of which is on the shaft 8. The shaft 14 has a universal coupling at 16 and is so journaled in a bearing-block 36 pivoted on set-screws 37 that the wheel $14^a$ may rock slightly with respect to the wheel $15^a$ to enable the cutter 3 to be raised and lowered the slight amount that is necessary to insert the sheet of uncut metal between the cutters and to force the cutters to its place after the sheet of metal has been inserted between the cutters.

The shaft 12 is provided with an actuator consisting of shaft 18 connected to the shaft 12 by universal joint and provided with a bearing and a hand crank $18^a$, which hand crank is connected to the shaft 18 by a reversible ratchet $18^b$ (shown in Fig. 15). The ratchet wheel $18^b$ is keyed to the shaft 18 and the pawl $18^c$ is arranged to be rotated in its seat in order that the ratchet wheel $18^b$ may be capable of rotation in either direction but held from back rotation or may be entirely disconnected; the selected rotation being determined by the temporary arrangement of the pawl $18^c$.

The pawl $18^c$ is turned by a little hand crank $18^d$. The hand drive permits an operation of the machine which is sometimes desirable in setting work and in starting work and also actuates the shaft 12 when changing the change speed gears. The power operation is brought into action by means of a clutch 19 (shown in detail in Figs. 6 and 7). The clutch is actuated by treadle $19^a$. The clutch comprises a toothed ring $19^b$ around which engages a fork $19^c$ and the tooth of which can be brought by the action of the treadle $19^a$ into engagement with the oppositely toothed ring $19^d$ on the shaft 12.

20 are ring segments running in the races $20^a$. These segments are bolted to the fork $19^c$.

The change speed is brought into action by keying one of the loose wheels $13^a$, $13^b$ or $13^c$ to the shaft 13 by means of the shifting handle $13^e$, which controls the ring $13^f$ and shifts the key $13^g$ along the spline in the shaft 13. Inasmuch as the loose wheels are always in mesh with the fixed wheels on the shaft 12 and those fixed wheels are controlled by means of the crank $18^a$, the key can be actuated along the spline into engagement with or past any one of the loose wheels quite readily. The shaft 12 is usually driven by a pulley 34 and belt $34^a$ when the clutch 19 is thrown into engagement and the hand drive is thrown off by lifting the pawl $18^c$ against the tension of the spring $18^e$ and turning the crank $18^d$ so that it rests on the top of a projected portion $18^f$ of the pawl-containing socket. The shaft 18 then rotates under the influence of the power drive, but the crank $18^a$ does not turn.

The cutter 3 is adjusted vertically by shifting the bearings in which its shaft is supported vertically in the guide 21. The cutter head 4 is regulated and adjusted by shifting its shaft along bearings 22; the shaft is held in place by means of the set screws 23 and 24 and screw collar 25. The beveled wheel $8^d$ is held to the shaft by a spline and is adjustable there along to properly engage with the wheel $15^b$.

Figs. 12, 16 and 17 show sets of cutter blades that in principle correspond exactly with the cutter blades shown in Fig. 11. Thus in Fig. 12 the blades are arranged closely to the vertical, while the shafts are nearly horizontal. The zones 26 and $26^a$ correspond with 6 and $6^a$ on the blades of Fig. 11; 27 and $27^a$ correspond with 5 and $5^a$, and 28 and $28^a$ correspond with 7 and $7^a$. In Figs. 16 and 17, two views of the cutters blades arranged nearly horizontal and the shafts nearly vertical are shown. In order to preserve the approximately 88° cutting edge the cutter becomes nearly cylindrical; $26^b$ and $26^c$ corresponding with 6 and $6^a$ of Fig. 11; $27^b$ and $27^c$ corresponding with 5 and $5^a$; and $28^b$ and $28^c$ corresponding with 7 and $7^a$. It is thus seen that the inclination of the shafts may be varied but such variance requires a variance of the shape of the cutter blades so as to provide for adjustment and a horizontal feed. I prefer the inclination of the shafts and shape of the blades shown in Fig. 11, as the blades are a more convenient shape and the shafts may be conveniently journaled and the drive connections easily made.

The plate or stripping-finger 30 is bolted on to the shaft-bearing 22 by the bolts 31. It lies a little below the cutting line and serves to strip the metal from the cutter, and is particularly desirable when circles of small radii are being cut out. The stripping finger 32 is bolted to the guide-piece 21 and is slightly above the cutting line, being curved at its depended end so as to present an obstructing face across the width of the cutters.

What I claim is:—

1. In a shearing machine, the combination of a pair of cutters formed by zones of cones, revoluble shafts for said cutters, tipped with respect to the plane of the work and tipped with respect to each other, the tipping and the shaping of the cutters being arranged with respect to each other so that planes perpendicular to the axes of the shafts and passing through the cutting edges cross and two surfaces of the cutters, one from each cutter, lie in parallel and closely contiguous planes so that the cutters can pass each other up to as far as their respective shafts and maintain their shearing relation, and means for adjustably moving one of said cutters in a path parallel with such last mentioned planes, substantially as described.

2. A shearing machine, having in combination, a frame, a pair of cutters, one of which is journaled in the frame and both of which are formed by zones of cones, revoluble shafts for said cutters tipped with respect to the plane of the work and tipped with respect to each other, the tipping being arranged with respect to the shape of the cutters so that planes perpendicular to the axes of the shafts and passing through the cutting edges cross and two surfaces, one from each cutter, lie in parallel and closely contiguous planes so that the said cutters can pass each other up to as far as their respective shafts and maintain the shearing relation, a bearing-block for carrying the other cutter shaft, a guide attached to said frame in which the bearing-block reciprocates in a path parallel to the planes of the aforementioned two surfaces of the cutters, means for adjustably reciprocating said bearing-block in the guide, flexible driving connections with the shaft carried in said bearing-block and driving connections for the other shaft, substantially as described.

3. In a cutting machine, the combination of a pair of cutters, revoluble shafts carrying said cutters, the said shafts and cutters being tipped from the work and from the horizontal and also from each other so as to cause planes perpendicular of the axes of the shafts and passing through the cutting edges of the cutters to cross, substantially as described.

In testimony whereof, I sign this specification in the presence of two witnesses.

HENRY COLLIER SMITH.

Witnesses:
CHARLES F. BURTON,
VIRGINIA C. SPRATT.